(12) United States Patent
Tsukuda et al.

(10) Patent No.: US 9,373,826 B2
(45) Date of Patent: Jun. 21, 2016

(54) STORAGE BATTERY MODULE (75) Inventors: Yoshihiro Tsukuda, Osaka (JP); Satoshi Okano, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 938 days.

(21) Appl. No.: 13/566,284

(22) Filed: Aug. 3, 2012

(65) Prior Publication Data

US 2013/0034753 A1 Feb. 7, 2013

(30) Foreign Application Priority Data

Aug. 3, 2011 (JP) .................. 2011-169971

(51) Int. Cl.
- *H01M 2/00* (2006.01)
- *H01M 2/10* (2006.01)
- *H01M 2/02* (2006.01)
- *H01M 10/0525* (2010.01)
- *H01M 10/0585* (2010.01)
- *H01M 10/617* (2014.01)

(52) U.S. Cl.
CPC .......... *H01M 2/1016* (2013.01); *H01M 2/1077* (2013.01); *H01M 2/0207* (2013.01); *H01M 10/0525* (2013.01); *H01M 10/0585* (2013.01); *H01M 10/617* (2015.04)

(58) Field of Classification Search
CPC ............ H01M 2/1077; H01M 2/1016; H01M 10/617; H01M 2/0207; H01M 10/0585; H01M 10/0525

See application file for complete search history.

(56) References Cited

U.S. PATENT DOCUMENTS

| | | | |
|---|---|---|---|
| 2005/0202311 A1* | 9/2005 | Higashino et al. | 429/99 |
| 2010/0221633 A1* | 9/2010 | Fujita et al. | 429/452 |
| 2011/0115437 A1* | 5/2011 | Kasai | 320/134 |

FOREIGN PATENT DOCUMENTS

| | | |
|---|---|---|
| CN | 101821891 A | 9/2010 |
| JP | 2003-28883 | 10/2003 |
| JP | 2008-181765 | 8/2008 |

* cited by examiner

*Primary Examiner* — Muhammad Siddiquee (74) *Attorney, Agent, or Firm* — Nixon & Vanderhye PC (57) ABSTRACT

A storage battery module is provided in which, even in a case where the storage battery module is formed by integrally assembling a plurality of secondary batteries, the secondary batteries can be compactly assembled while non-uniformity in battery temperature distribution is prevented, and wiring connection work is facilitated. Using a secondary battery RB (RB1 to RB4) including a battery can 10 that houses an electrode group 1 and rectanglar shape two secondary batteries are juxtaposed in parallel, they are spaced by a predetermined distance from each other, and with respect to these juxtaposed secondary batteries as one unit, in a direction in which units of these are stacked, these units are shifted in orientation by 90° from each other, and thus a storage battery module (M1 to M8) having a configuration in which a plurality of secondary batteries are stacked in parallel crosses is obtained.

8 Claims, 7 Drawing Sheets

STORAGE BATTERY MODULE

This application is based on Japanese Patent Application No. 2011-169971 filed on Aug. 3, 2011, the contents of which are hereby incorporated by reference.

BACKGROUND OF THE INVENTION

1. Field of the Invention

The present invention relates to a storage battery module formed by joining together a plurality of secondary batteries into a module.

2. Description of Related Art

In recent years, a lithium secondary battery has been used as a battery for a power source of a mobile electronic device such as a cellular phone, a notebook-sized personal computer, or the like since it has a high energy density and can achieve size and weight reduction. Furthermore, a lithium secondary battery has been coming into focus also as a motor driving power source of an electric vehicle (EV), a hybrid electric vehicle (HEV), or the like or as a storage battery for power storage since it can achieve a larger capacity.

A lithium secondary battery as described above has the following configuration. That is, an electrode group in which a positive electrode plate and a negative electrode plate are disposed opposite to each other with a separator interposed therebetween is housed inside an outer case constituting a battery can, and an electrolyte is filled therein. The lithium secondary battery is provided with a positive electrode current collector terminal that is connected to a positive electrode current collector tab of each of a plurality of the positive electrode plates, a positive electrode external terminal that is electrically connected to the positive electrode current collector terminal, a negative electrode current collector terminal that is connected to a negative electrode current collector tab of each of a plurality of the negative electrode plates, and a negative electrode external terminal that is electrically connected to the negative electrode current collector terminal.

Furthermore, it has been sought to join together a plurality of such lithium secondary batteries to use them as a large-scale power source for providing power, and there has already been proposed, for example, a battery assembly formed by stacking one on top of each other, single cells each constituted by a secondary battery including a stacked type electrode group (see, for example, Patent Document 1: JP-A-2003-288883).

A lithium secondary battery including a stacked type electrode group has the following configuration. That is, an electrode group in which positive electrode plates and negative electrode plates are stacked via separators to form a plurality of layers is housed in an outer case, and a non-aqueous electrolyte is filled therein. The lithium secondary battery is provided with a positive electrode current collector terminal that is connected to a positive electrode current collector tab of each of the positive electrode plates, an external terminal that is electrically connected to the positive electrode current collector terminal, a negative electrode current collector terminal that is connected to a negative electrode current collector tab of each of the negative electrode plates, and an external terminal that is electrically connected to the negative electrode current collector terminal.

By joining together a plurality of lithium secondary batteries having this configuration, a large capacity battery assembly (storage battery module) can be constructed. Furthermore, as a method for connecting together a plurality of secondary batteries, preferably, a predetermined number of secondary batteries are integrally connected together, with a protection circuit also integrally incorporated therewith, to form a base module having a predetermined capacity and made up of the predetermined number of secondary batteries, and the base modules are combined to form a storage battery that achieves a predetermined electricity storage capacity.

Furthermore, in joining together a plurality of secondary batteries, preferably, the secondary batteries can be securely fixed so that a relative positional shift therebetween is prevented, and an operation of interconnecting external terminals to be connected to each other is facilitated. From this viewpoint, there has already been proposed a battery pack in which a plurality of battery cells are integrally assembled, and electrode terminals of adjacent ones thereof can be easily interconnected without the use of a bus bar (see, for example, Patent Document 2: JP-A-2008-181765).

A storage battery module having a predetermined battery capacity can be manufactured by electrically connecting together a plurality of secondary batteries, and a large capacity storage battery can be constructed by combining a plurality of such storage battery modules. In assembling a plurality of secondary batteries, however, in the configuration in which stacked type secondary batteries having a rectangular shape in a plan view are simply stacked, the secondary batteries are brought into contact with each other at their center portions where heat is generated, which brings about an undesirable situation in which temperature non-uniformity occurs to cause electrode deterioration.

Locally caused electrode deterioration is undesirable in that it leads not only to a decrease in battery capacity but also to a short circuit due to electrode peeling or a short circuit due to a dendrite generated when an electrolyte is partly dried. Furthermore, in each of final products such as a power storage module and a battery assembly, preferably, for electrical connection to an external device, two terminals of the storage battery module, which are a positive electrode terminal and a negative electrode terminal, are provided close to each other.

Based on the above, in constructing a storage battery module having a predetermined capacity by joining together a plurality of stacked type secondary batteries, preferably, the module is configured such that the plurality of secondary batteries can be compactly connected together while non-uniformity in battery temperature distribution is prevented, and wiring connection work is facilitated. Furthermore, preferably, the module is configured such that positive and negative electrode input/output external terminals are provided close to each other.

SUMMARY OF THE INVENTION

In view of the above-described problems, it is an object of the present invention to provide a storage battery module in which, even in a case where the storage battery module is formed by integrally assembling a plurality of secondary batteries, the plurality of secondary batteries can be compactly assembled while non-uniformity in battery temperature distribution is prevented, and wiring connection work is facilitated.

In order to achieve the above-described object, the present invention provides a storage battery module including a stacked type secondary battery having an electrode group in which positive electrode plates and negative electrode plates are stacked via separators to form a plurality of layers. The storage battery module is composed of a plurality of the secondary batteries connected together and integrated into one body. The secondary battery includes a battery can that houses the electrode group and has, in a plan view, the shape of a rectangle with a long side and a short side. In the storage battery module, a plurality of the secondary batteries are stacked in parallel crosses such that in a direction in which the secondary batteries are juxtaposed, with the respective long sides thereof aligned in parallel, the secondary batteries are spaced by a predetermined distance from each other, and in a direction in which the secondary batteries are stacked, the secondary batteries are shifted in orientation by 90° from each other.

According to this configuration, the secondary batteries are juxtaposed such that each pair of adjacent ones thereof are spaced by a predetermined distance from each other and are also stacked in parallel crosses to construct a storage battery module, so that the secondary batteries are prevented from being hermetically sealed at their center portions where heat is likely to be generated, thus being free from the occurrence of heat accumulation. Thus, even in a case where a plurality of the secondary batteries are integrally assembled, the secondary batteries can be compactly assembled while non-uniformity in battery temperature distribution is prevented. Furthermore, a gap portion between juxtaposed secondary batteries being spaced from each other can be used as a wiring portion, and thus wiring is prevented from being exposed to the exterior, so that the need to provide an extra wiring route is eliminated to facilitate wiring connection work.

Furthermore, in the present invention, in the storage battery module configured as above, positive and negative electrode external terminals are provided on both opposed side surfaces of the battery can along the short sides thereof, respectively. A pair of the secondary batteries are juxtaposed side by side such that the respective positive and negative electrode external terminals thereof are alternate in orientation to form a tier unit, and the tier units are stacked in parallel crosses. According to this configuration, on a common side surface of the tier unit, one of the secondary batteries has the external terminal for a positive electrode, while the other has the external terminal for a negative electrode, and thus at a common side surface portion, these external terminals can be interconnected in series, and each of these can also be connected to another input/output connection terminal. Furthermore, it is possible to construct a large-scale storage battery module having a desired large capacity by stacking the tier units in parallel crosses.

Furthermore, in the present invention, in the storage battery module configured as above, the tier units are stacked in two tiers, and the tier unit in the first tier and the tier unit in the second tier are shifted in orientation by 90° from each other so that four of the secondary batteries in total are assembled in parallel crosses. According to this configuration, the tier units each including a pair of the secondary batteries juxtaposed side by side such that they are spaced by a predetermined distance from each other are stacked such that the tier units are shifted in orientation by 90° from each other, and thus the secondary batteries can be easily stacked in parallel crosses, with an open space portion formed in a center portion thereof.

Furthermore, in the present invention, in the storage battery module configured as above, the secondary batteries included in the tier unit in the first tier and the secondary batteries included in the tier unit in the second tier are assembled in parallel crosses to form a base module, and a plurality of the base modules are combined into a large capacity module. According to this configuration, a storage battery module having a capacity of an integral multiple of a total capacity of the four secondary batteries included in the tier unit in the first tier and the tier unit in the second tier can be easily constructed. Furthermore, work to establish electrical connection between the base modules combined to be connected together can be performed at a side portion of the battery can, and thus wiring connection work can be easily performed.

Furthermore, in the present invention, in the storage battery module configured as above, the base modules are stacked one on top of each other and integrated into one body. According to this configuration, a storage battery module having a desired large capacity can be obtained by stacking the base modules in an arbitrary number of tiers.

Furthermore, in the present invention, in the storage battery module configured as above, an upper one and a lower one of the stacked base modules are shifted in orientation by 180° from each other. According to this configuration, since the base modules are stacked such that they are shifted in orientation by 180° from each other, positive and negative electrode external terminals of the tier unit on the lower side can be disposed in proximity to negative and positive electrode external terminals of the tier unit on the upper side, respectively, and thus the upper one and the lower one of the base modules can be easily connected together in series.

Furthermore, in the present invention, in the storage battery module configured as above, the base modules are juxtaposed horizontally and integrated into one body. According to this configuration, when the storage battery module is laid horizontally, a storage battery module having a desired large capacity and reduced in height can be obtained. Furthermore, when the storage battery module is disposed in a standing manner, a storage battery module having a desired large capacity and reduced in width can be obtained.

Furthermore, in the present invention, in the storage battery module configured as above, one protection circuit is integrally provided per the base module. According to this configuration, regardless of whether the base modules are connected together laterally or vertically, a plurality of the base modules can be easily connected together simply by electrically connecting the respective protection circuits thereof, and thus the base modules can be easily connected together whether in a lateral direction or in a vertical direction, so that how the base modules are combined can be arbitrarily selected.

DETAILED DESCRIPTION OF PREFERRED EMBODIMENTS

The following describes embodiments of the present invention with reference to the appended drawings. In the following, like constituent members are indicated by like reference characters, and detailed descriptions thereof are omitted where appropriate.

Figure 1:
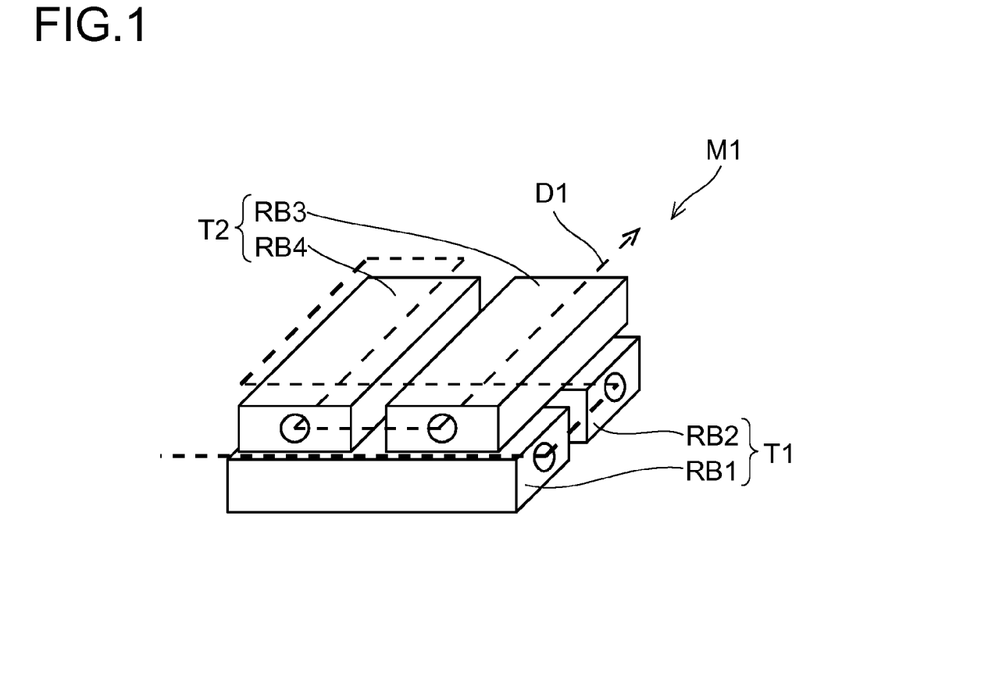
FIG. 1 is a schematic perspective view showing an example of a first embodiment of a storage battery module according to the present invention.
Figure 2:
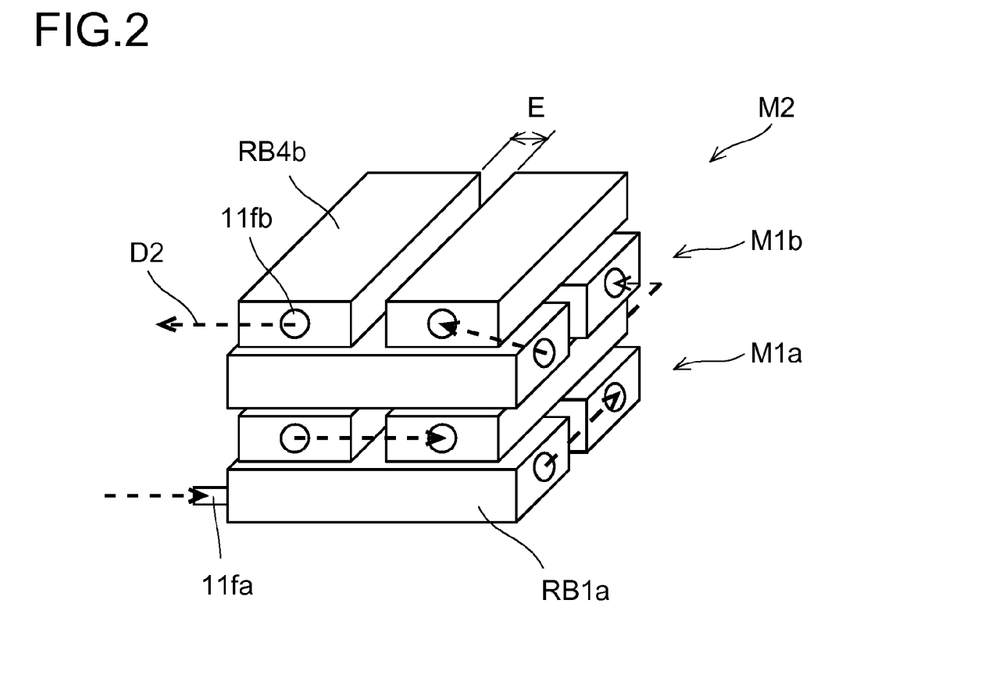
FIG. 2 is a schematic perspective view showing an example of a second embodiment of the storage battery module.

Referring to FIGS. 1 and 2, a description is given of a storage battery module M1 according to the embodiments of the present invention. FIG. 1 is a schematic perspective view showing an overall configuration of the storage battery module M1 of a first embodiment, and FIG. 2 is a schematic perspective view showing an overall configuration of a storage battery module M2 of a second embodiment. The storage battery modules M1 and M2 are each formed by joining together a plurality of stacked type secondary batteries (single cells) in order to achieve a large battery capacity, and, for example, in the storage battery module M1 shown in FIG. 1, four secondary batteries RB1, RB2, RB3, and RB4 are combined and integrated into one body.

Furthermore, the storage battery module M2 shown in FIG. 2 has a configuration in which storage battery modules of the same type as the storage battery module M1 shown in FIG. 1 are stacked in two tiers, and a lower storage battery module M1$a$ and an upper storage battery module M1$b$ are electrically connected to each other in series such that eight secondary batteries are connected together in eight series to be integrated into one body.

As will be described later, each of the secondary batteries RB1, RB2, RB3, and RB4 includes an electrode group and a battery can that houses the electrode group. The battery can has an outer case that houses the electrode group and a lid member that hermetically seals an opening portion of the outer case. Furthermore, the outer case and the lid member are sealed to each other by welding, bonding, seaming, or the like.

A secondary battery used in the embodiments of the present invention is constituted by, for example, a stacked type lithium secondary battery. In this type of lithium secondary battery, a stacked type electrode group 1 in which positive electrode plates and negative electrode plates are stacked via separators to form a plurality of layers is housed in a battery can, and an electrolyte is filled in the battery can. Furthermore, by using electrode plates having an increased area and by increasing the number of electrode plates to be stacked in layers, a relatively large capacity secondary battery is obtained that is applicable to a storage battery for an electric vehicle, a storage battery for power storage, of the like.

Next, referring to FIGS. 7 to 10, a description is given of specific configurations of a stacked type lithium secondary battery RB and the electrode group 1.

Figure 7:
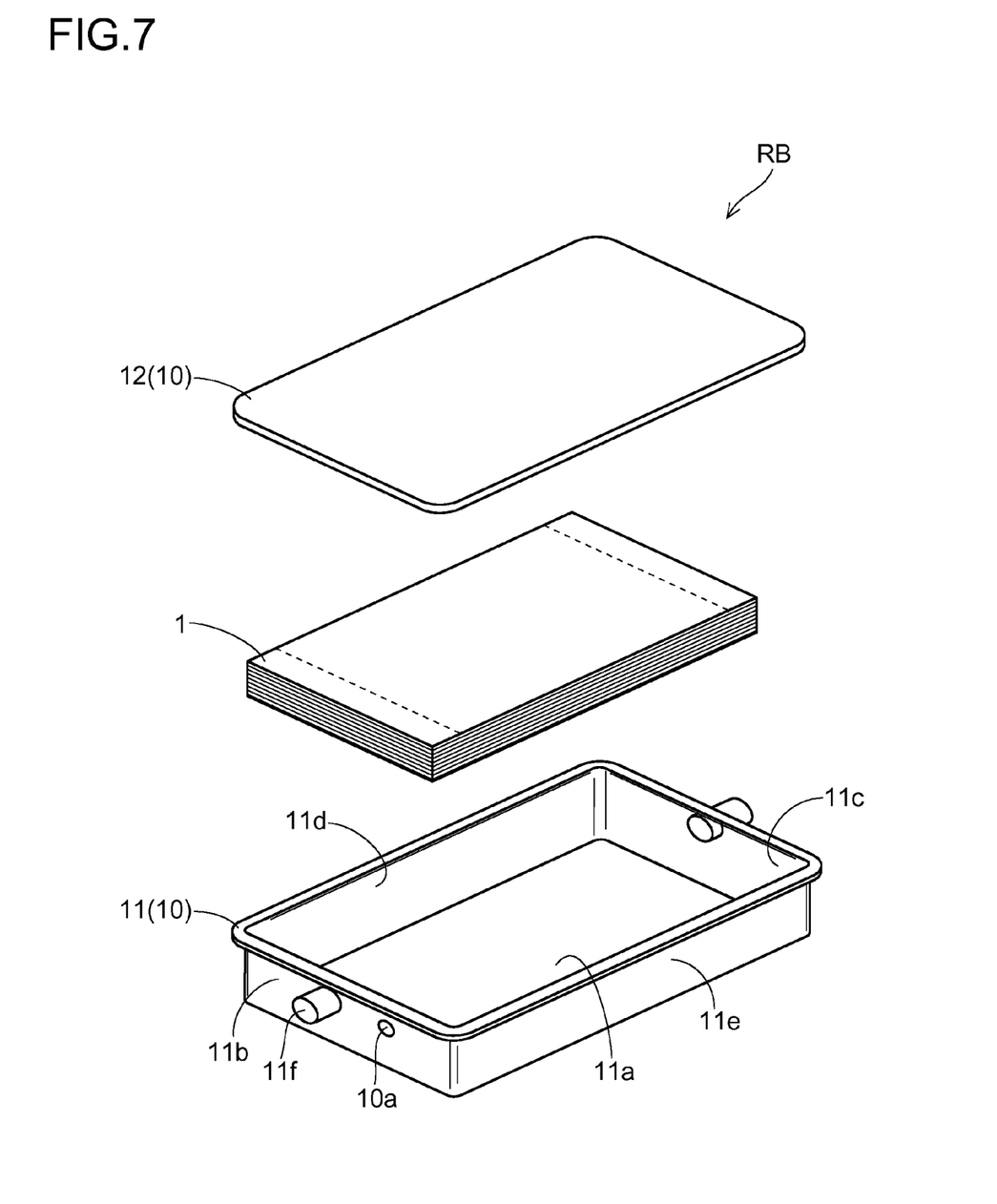
FIG. 7 is an exploded perspective view of a secondary battery.

As shown in FIG. 7, the stacked type lithium secondary battery RB has a rectangular shape (including a rectangular shape whose corners are rounded) in a plan view and includes the electrode group 1 in which the positive electrode plate, the negative electrode plate, and the separator, each of which has a rectangular shape, are stacked in layers. Furthermore, the electrode group 1 is housed in a battery can 10 composed of a box-shaped outer case 11 having a bottom portion 11$a$ and side portions 11$b$ to 11$e$ and a lid member 12, and the lithium secondary battery RB is charged and discharged through external terminals 11$f$ provided at a side surface(s) (for example, opposed two side surfaces corresponding to the side portions 11$b$ and 11$c$, respectively) of the outer case 11.

Figure 8:
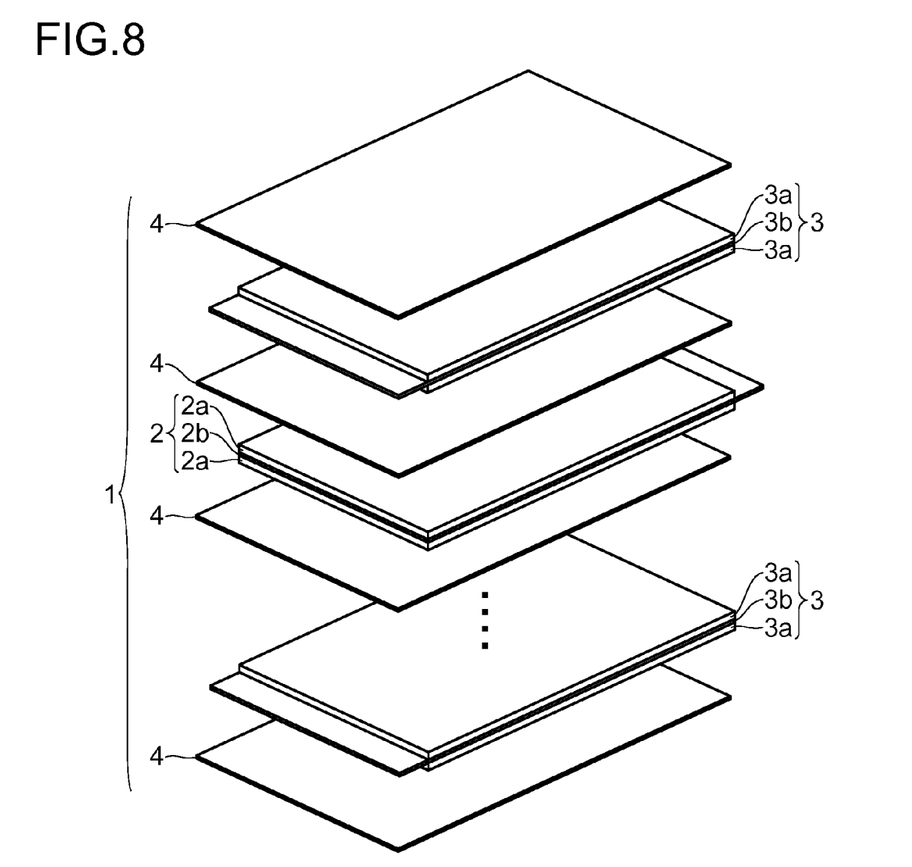
FIG. 8 is an exploded perspective view of an electrode group included in the secondary battery.

The electrode group 1 has a configuration in which the positive electrode plates and the negative electrode plates are stacked via the separators to form a plurality of layers, and as shown in FIG. 8, a positive electrode plate 2 having a positive electrode current collector 2$b$ (for example, aluminum foil) on each side of which a positive electrode active material layer 2$a$ made of a positive electrode active material is formed and a negative electrode plate 3 having a negative electrode current collector 3$b$ (for example, copper foil) on each side of which a negative electrode active material layer 3$a$ made of a negative electrode active material is formed are stacked to each other via a separator 4.

While the positive electrode plate 2 and the negative electrode plate 3 are insulated from each other by the separator 4, lithium ions can migrate between the positive electrode plate 2 and the negative electrode plate 3 via the electrolyte filled in the outer case 11.

Herein, examples of the positive electrode active material used in the positive electrode plate 2 include lithium-containing oxides ($LiFePO_4$, $LiCoO_2$, $LiNiO_2$, $LiFeO_2$, $LiMnO_2$, $LiMn_2O_4$, etc.) and compounds obtained by partly substituting transition metals in these oxides with another metal element. Particularly in a case where, among these, a material that allows, in normal use, 80% or more of lithium contained in the positive electrode plate 2 to be used for a battery reaction is used as a positive electrode active material, it is possible to increase safety against accidents such as an overcharge.

Furthermore, as the negative electrode active material used in the negative electrode plate 3, a lithium-containing material or a lithium intercalatable/deintercalatable material is used. Particularly, in order to obtain a high energy density, it is preferable to use a material having an intercalation/deintercalation potential of lithium approximate to the oxidation/reduction potential of metal lithium. Such a material is typified by particle-like (for example, scale-like, lump-like, fiber-like, whisker-like, sphere-like, and pulverized particle-like) natural graphite or artificial graphite.

In addition to the positive electrode active material used in the positive electrode plate 2, and in addition to the negative electrode active material used in the negative electrode plate 3, an electrically conductive material, a thickening agent, a binding agent, and so on may be contained. The electrically conductive material is not particularly limited as long as it is an electronically conductive material that has no adverse effect on battery performance of the positive electrode plate 2 and that of the negative electrode plate 3, and examples thereof that can be used include carbonaceous materials such as carbon black, acetylene black, Ketjen black, graphite (natural graphite, artificial graphite), and carbon fibers, and electrically conductive metal oxides.

Examples of the thickening agent that can be used include polyethylene glycols, celluloses, polyacrylamides, poly-N-vinylamides, and poly-N-vinyl-pyrrolidones. The binding agent serves to bind active material particles and electrically conductive material particles, and as the binding agent, there can be used any of fluorine polymers such as polyvinylidene fluoride, polyvinylpyridine, and polytetrafluoroethylene, polyolefin polymers such as polyethylene and polypropylene, styrene butadiene rubber, and so on.

Furthermore, as the separator 4, a microporous high polymer film is used preferably. Specifically, there can be used any of films made of polyolefin high polymers such as nylon, cellulose acetate, nitrocellulose, polysulfone, polyacrylonitrile, polyvinylidene fluoride, polypropylene, polyethylene, polybutene, and so on.

Furthermore, as the electrolyte, an organic electrolyte is used preferably. Specifically, as an organic solvent for the organic electrolyte, there can be used any of esters such as ethylene carbonate, propylene carbonate, butylene carbonate, diethyl carbonate, dimethyl carbonate, methyl ethyl carbonate, and γ-butyrolactone, ethers such as tetrahydrofuran, 2-methyltetrahydrofuran, dioxane, dioxolane, diethyl ether, dimethoxyethane, diethoxyethane, and methoxyethoxyethane, and further, dimethyl sulfoxide, sulfolane, methylsulfolane, acetonitrile, methyl formate, methyl acetate, and so on. These organic solvents may be used alone or in the form of a mixture of two or more kinds.

Moreover, the organic solvent may contain an electrolytic salt. Examples of the electrolytic salt include lithium salts such as lithium perchlorate ($LiClO_4$), lithium tetrafluoroborate, lithium hexafluorophosphate, trifluoromethanesulfonic acid ($LiCF_3SO_3$), lithium fluoride, lithium chloride, lithium bromide, lithium iodide, and lithium aluminate tetrachloride. These electrolytic salts may be used alone or in the form of a mixture of two or more kinds.

The concentration of the electrolytic salt is, though not particularly limited, preferably about 0.5 to about 2.5 mol/L and more preferably about 1.0 to 2.2 mol/L. In a case where the concentration of the electrolytic salt is lower than about 0.5 mol/L, there is a risk that the carrier concentration in the electrolyte becomes low, so that the resistance of the electrolyte becomes high. On the other hand, in a case where the concentration of the electrolytic salt is higher than about 2.5 mol/L, there is a risk that the dissociation degree of the salt itself becomes low, so that the carrier concentration in the electrolyte does not rise.

Figure 9:
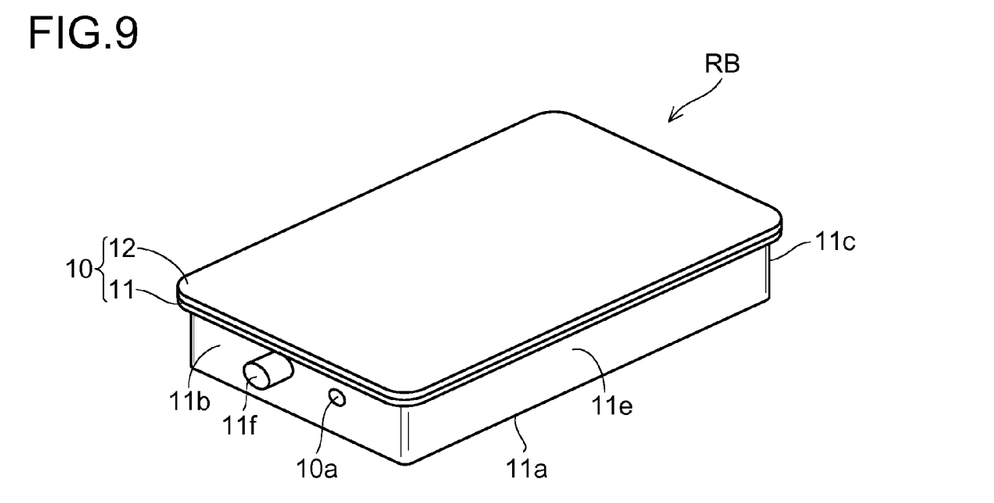
FIG. 9 is a perspective view showing the secondary battery as a completed product.

The battery can 10 includes the outer case 11 and the lid member 12 and is made of any of iron, iron plated with nickel, stainless steel, aluminum, and so on. Furthermore, in the embodiments of the present invention, as shown in FIG. 9, the battery can 10 is formed such that when the outer case 11 and the lid member 12 are combined with each other, its outer shape is practically a flat quadrangle.

The outer case 11 is in a box shape, having the bottom portion 11a with a substantially rectangular bottom surface and the four side portions 11b to 11e provided to stand from the bottom portion 11a, and the electrode group 1 is housed inside this box shape. The electrode group 1 is provided with a positive electrode current collector terminal that is connected to a current collector tab of the positive electrode plate and a negative electrode current collector terminal that is connected to a current collector tab of the negative electrode plate, and the external terminals 11f that are electrically connected to these current collector tabs, respectively, are provided at the side portions of the outer case 11, respectively. The external terminals 11f are provided at, for example, two locations that are the opposed two side portions 11b and 11c, respectively. Furthermore, reference character 10a indicates a liquid injection port through which an electrolyte is injected.

After the electrode group 1 is housed in the outer case 11 and the current collector terminals thereof are connected to the external terminals, respectively, or after the external terminals are connected to the current collector terminals of the electrode group 1, respectively, which is then housed in the outer case 11, and the external terminals are firmly fixed to predetermined areas of the outer case, respectively, the lid member 12 is fixed to an opening edge of the outer case 11. As a result, the electrode group 1 is held in a sandwiched manner between the bottom portion 11a of the outer case 11 and the lid member 12 and thus is held inside the battery can 11. The lid member 12 is fixed to the outer case 11 by, for example, laser welding or the like. Furthermore, connection between the current collector terminals and the external terminals can be established not only by welding such as ultrasonic welding, laser welding, or resistance welding but also by the use of an electrically conductive adhesive or the like. Furthermore, other connection methods than these may also be adopted, and, for example, a configuration may be adopted in which the outer case 11 and the lid member 12 are seamed together at their side edges so that hermetic sealing is achieved between them.

As described above, the stacked type secondary battery according to the embodiments of the present invention has a configuration including the electrode group 1 in which the positive electrode plates 2 and the negative electrode plates 3 are stacked via the separators 4 to form a plurality of layers, the outer case 11 in which the electrode group 1 is housed and the electrolyte is filled, the external terminals 11f that are provided at the outer case 11, the positive and negative electrode current collector terminals that electrically connect the positive and negative electrode plates to the external terminals 11f, respectively, and the lid member 12 that is fitted to the outer case 11.

Figure 10:
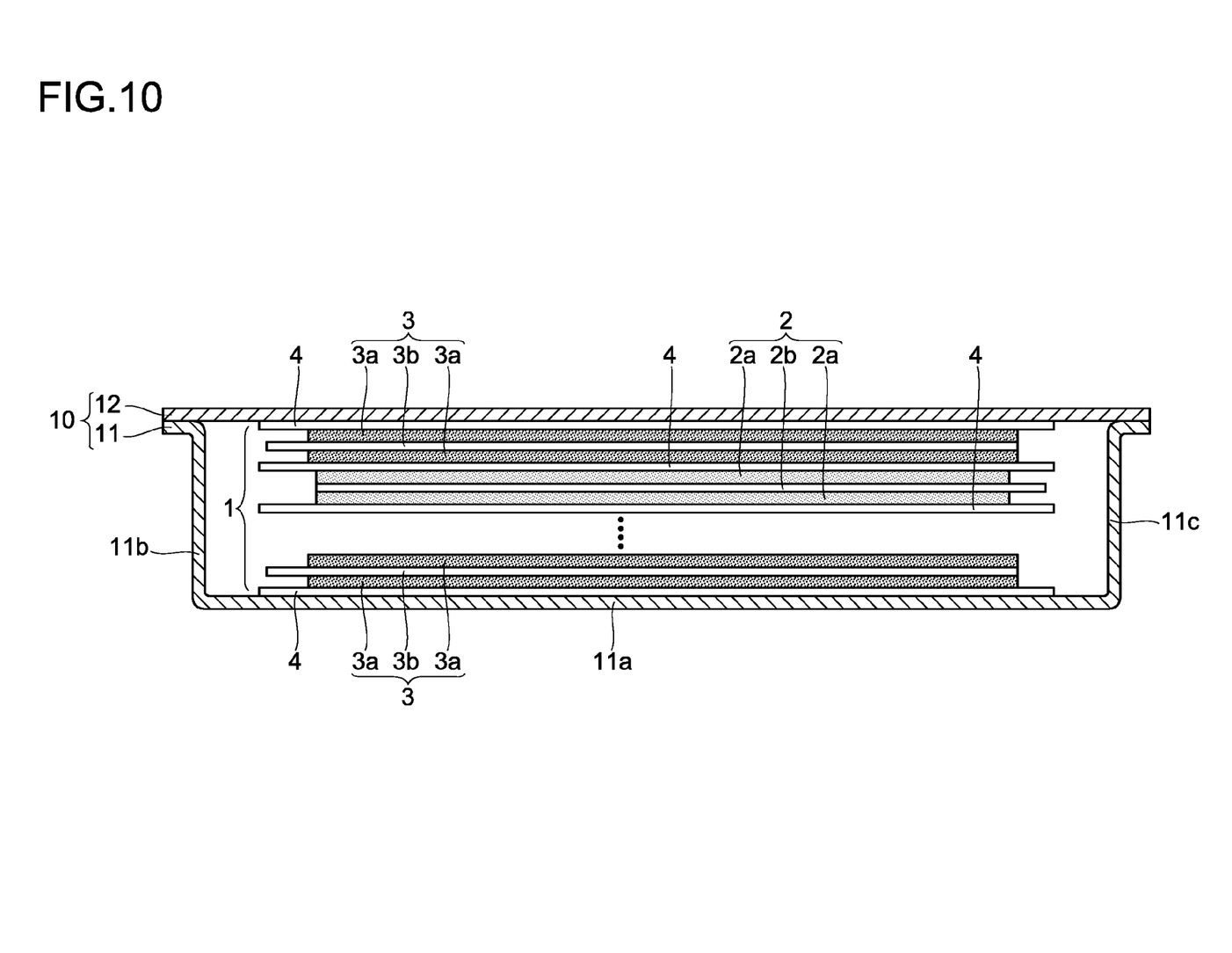
FIG. 10 is a schematic sectional view of the electrode group.

In the electrode group 1 housed in the outer case 11, for example, as shown in FIG. 10, the positive electrode plate 2 having the positive electrode current collector 2b on each side of which the positive electrode active material layer 2a is formed and the negative electrode plate 3 having the negative electrode current collector 3b on each side of which the negative electrode active material layer 3a is formed are stacked to each other via the separator 4, and the separator 4 is provided also on each of end surfaces of the electrode group 1. Furthermore, a configuration may be adopted in which, instead of providing the separator 4 on each of the end surfaces, a resin film made of the same material as that of the separator 4 is wrapped around the electrode group 1 so that the electrode group 1 is covered with the resin film having an insulation property. Either of these cases provides a configuration in which a member having electrolyte permeability and an insulation property is stacked on an upper surface of the stacked type electrode group 1. This permits the lid member 12 to be brought into direct contact with this surface and even permits this surface to be pressed at a predetermined pressure via the lid member 12.

Furthermore, in order to directly stack the above-described secondary batteries, it is preferable that the battery cans 10 thereof be insulated from each other, and from this viewpoint, for example, the surface of the battery can 10 is coated with an insulator. This is to prevent the following. That is, since the battery can has on its surface an intermediate potential between a negative electrode potential and a positive electrode potential, particularly in a case where battery cans of series-connected single cells having a large capacity (for example, not less than 50 Ah) come into contact with each other on their respective surfaces, there occurs a short circuit between the respective surfaces of the battery cans.

Furthermore, in stacking the battery cans 10, for example, the battery cans 10 are sequentially stacked with insulation sheets interposed therebetween. In this case, upper and lower ones in each adjacently stacked pair of the battery cans are reliably insulated from each other, and thus a short circuit between the stacked battery cans is reliably prevented, so that predetermined battery capability is delivered properly. With this configuration in which the battery cans are insulated from each other, even in a case where the surface of either the outer case 11 constituting the battery can 10 or the lid member 12 is not sufficiently insulated, a short circuit between the stacked battery cans 10 can be reliably prevented. Furthermore, the insulation sheets interposed therebetween act as buffers and allow the respective secondary batteries to be securely fixed so as not to be positionally shifted.

As described above, the secondary battery used in the embodiments of the present invention includes the battery can 10 that houses the electrode group and has, in a plan view, the shape of a rectangle with a long side and a short side. Furthermore, in the storage battery module M1 of the first embodiment shown in FIG. 1, a plurality of the secondary batteries are stacked in parallel crosses and connected together to be integrated into one body such that in a direction in which the secondary batteries are juxtaposed, with the respective long sides thereof aligned in parallel, they are spaced by a predetermined distance from each other, and in a direction in which the secondary batteries are stacked, they are shifted in orientation by 90° from each other.

Furthermore, the positive and negative electrode external terminals are provided at both opposed side surfaces of the battery can 10 along the short sides thereof, respectively, and a tier unit is formed by juxtaposing a pair of the secondary batteries side by side such that the respective positive and negative electrode external terminals thereof are alternate in orientation. Furthermore, the storage battery module M1 is constructed by stacking the tier units in parallel crosses. With this configuration, on a common side surface of the tier unit, one of the secondary batteries has an external terminal for the positive electrode, while the other has an external terminal for the negative electrode, and thus at a common side surface portion, these external terminals can be interconnected in series, and wiring connection work to connect each of these to another input/output connection terminal also can be performed. Furthermore, it is possible to construct a large-scale storage battery module having a desired large capacity by stacking the tier units in parallel crosses.

For example, a first-tier unit T1 in which the secondary batteries RB1 and RB2 are provided to be spaced by a predetermined distance from each other and a second-tier unit T2 in which the secondary batteries RB3 and RB4 are provided to be spaced by a predetermined distance from each other are stacked one on top of each other in two tiers, and the first-tier unit T1 and the second-tier unit T2 are shifted in orientation by 90° from each other so that the four secondary batteries RB1 to RB4 in total are assembled in parallel crosses to form the storage battery module M1.

Furthermore, there is integrally provided a protection circuit for controlling the four secondary batteries RB1 to RB4. The protection circuit has a function of controlling operations such as charging and discharging of the electrode group 1 and a function of preventing an overcurrent from flowing through a control element such as an IC element and is provided at, for example, a gap portion in the upper tier of the tier units combined in parallel crosses, where the secondary batteries in the upper tier are spaced by a predetermined distance from each other. With this configuration in which the four secondary batteries are integrally assembled and the protection circuit is integrally provided therewith, it is possible to construct a storage battery having a desired large capacity by using the storage battery module M1 as a base module and combining the base modules.

For example, the storage battery module M2 of the second embodiment shown in FIG. 2 has a configuration in which the storage battery modules M1a and M1b (hereinafter, referred to respectively as base modules M1a, M1b, . . . ) each used as a base module are stacked one on top of each other in two tiers, so that the eight second batteries in total are electrically connected together in eight series. Furthermore, using an external terminal 11fa of a secondary battery RB1a of the base module M1a and an external terminal 11fb of a secondary battery RB4b of the base module M1b, charging and discharging of the base modules M1a and M1b are performed, and an electric current line D2 representing an electric current flow in this case is indicated by a broken line.

As can be understood from the flow of the electric current line D2, a flow direction of the electric current line D2 in the base module M1a and that in the base module M1b are symmetric with respect to each other in lateral and front-back directions in the figure. That is, the base modules M1a and M1b are stacked in orientations shifted (rotated) by 180° from each other. By stacking the base modules M1a and M1b such that they are shifted in orientation by 180° from each other as described above, the eight secondary batteries combined in parallel crosses can be easily connected together in series.

Figure 3A:
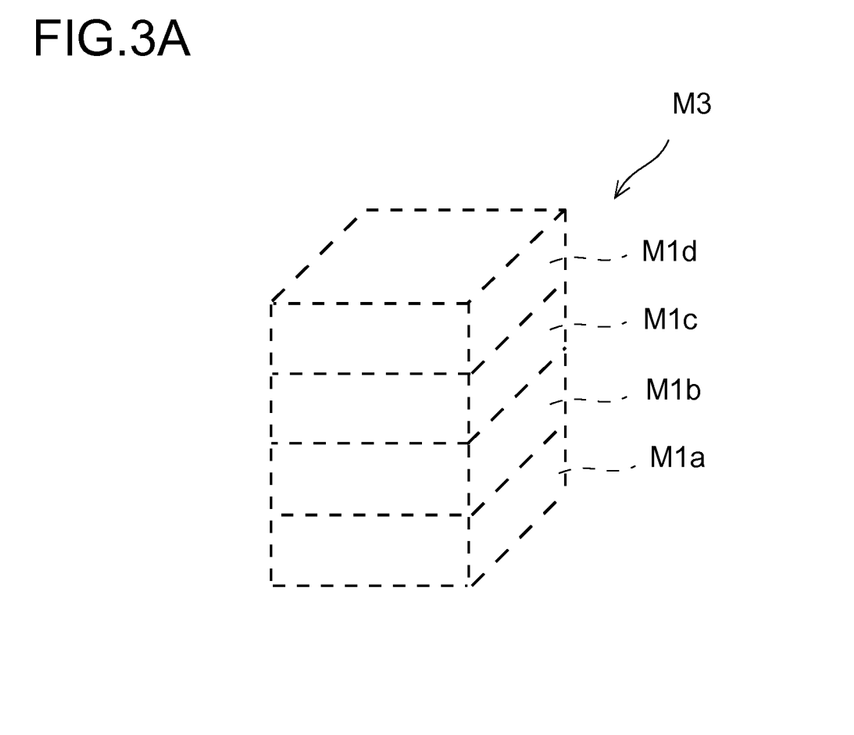
FIG. 3A is a schematic perspective view showing an example of another embodiment of the storage battery module in which base modules are stacked one on top of each other.
Figure 3B:
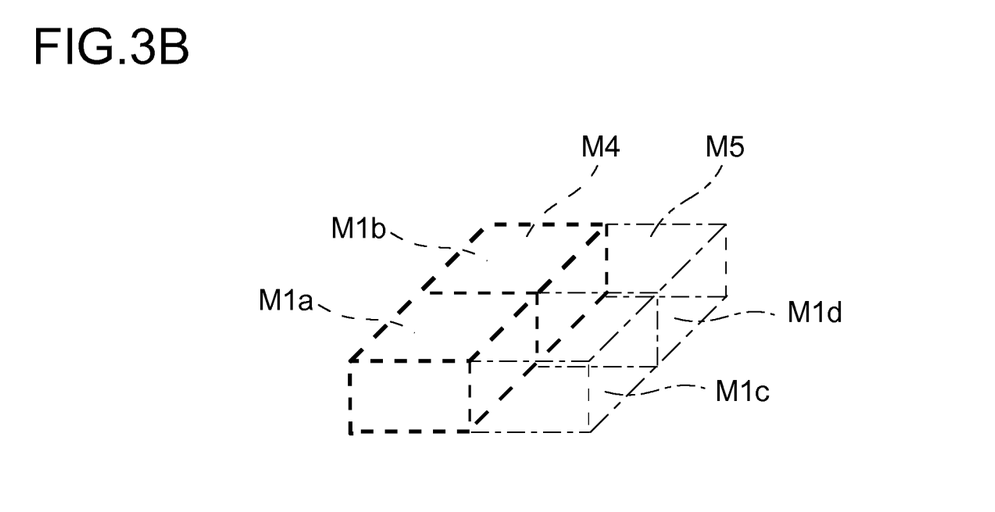
FIG. 3B is a schematic perspective view showing an example of still another embodiment of the storage battery module in which base modules are juxtaposed in a horizontal direction.

Furthermore, there may also be adopted a configuration in which the base modules are stacked one on top of each other in two or more tiers and a configuration in which a plurality of the base modules are juxtaposed in a horizontal direction instead of a vertical direction. For example, there may be adopted, as shown in FIG. 3A, a storage battery module M3 having 16 secondary batteries in total in which base modules M1 each formed by integrally assembling four secondary batteries are assembled in four tiers (M1a+M1b+M1c+M1d), as shown by a bold broken line in FIG. 3B, a storage battery module M4 (M1a+M1b) having eight secondary batteries in total in which two sets of base modules M1 each formed by integrally assembling four secondary batteries are juxtaposed in the horizontal direction, and as shown by an imaginary line in FIG. 3B, a storage battery module M5 (M1a+M1b+M1c+M1d) having 16 secondary batteries in total in which four sets of the base modules M1 are juxtaposed in the horizontal direction.

In any of the above-described configurations, a tier unit is formed by juxtaposing a pair of secondary batteries side by side such that they are spaced by a predetermined distance from each other, and a base module and a storage battery module are constructed by stacking the tier units in parallel crosses, so that the secondary batteries are prevented from overlapping each other at their center portions where heat is likely to be generated and from being hermetically sealed, thus being free from the occurrence of heat accumulation. Thus, even in a configuration in which a plurality of secondary batteries are integrally assembled, the secondary batteries can be compactly assembled while non-uniformity in battery temperature distribution is prevented. Furthermore, a gap portion between juxtaposed secondary batteries being spaced from each other can be used as a protection circuit installation portion or a wiring portion, and thus wiring is prevented from being exposed to the exterior, so that the need to provide an extra wiring route is eliminated to facilitate wiring connection work.

In a base module formed by assembling a plurality of secondary batteries in parallel crosses as described above, an open space portion (gap portion E: see FIG. 2) is formed in a center portion thereof, and thus the occurrence of heat accumulation at the center portion where heat is likely to be generated is prevented, so that a substantially uniform battery temperature distribution can be obtained. Furthermore, it also becomes possible to pass cooling air through the gap portion E for the purpose of air cooling.

Furthermore, each storage battery module is provided with a positive electrode terminal and a negative electrode terminal for establishing electrical connection to the exterior. Furthermore, predetermined ones of the external terminals 11f of secondary batteries are used as the positive electrode terminal and the negative electrode terminal, respectively. For example, a storage battery module M6 of a third embodiment shown in FIG. 4A has a configuration in which base modules M1*a* and M1*b* are juxtaposed in a horizontal direction, and connection is established such that an external terminal 11*fa* of a secondary battery RB1*a* in the first tier of the base module M1*a* is used as the positive electrode terminal, and an external terminal 11*fb* of a secondary battery RB2*b* in the first tier of the base module M1*b* is used as the negative electrode terminal.

Figure 4A:
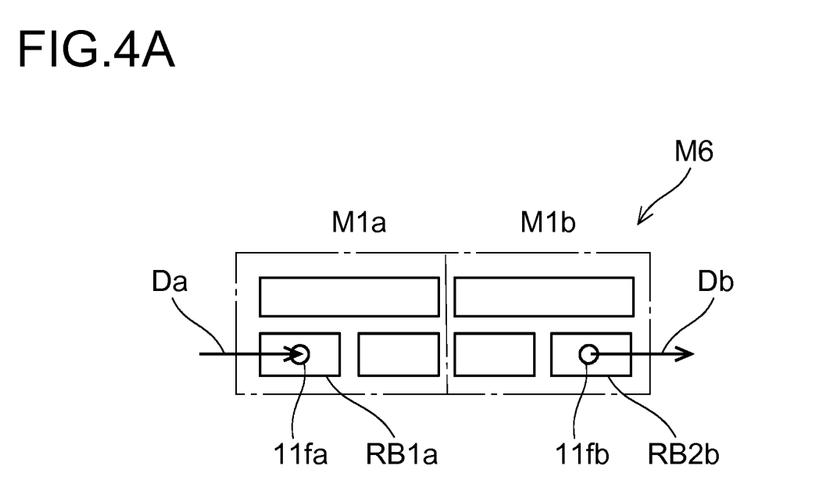
FIG. 4A is a schematic front view showing an example of a third embodiment of the storage battery module.

That is, the storage battery module M6 is provided with the positive electrode terminal and the negative electrode terminal that are used to provide wiring of a positive electrode line Da and wiring of a negative electrode line Db, respectively, at substantially the same level in height on a common side surface of this integrally formed module and thus can easily establish electrical connection to an external device.

Furthermore, a positive electrode terminal and a negative electrode terminal may be provided at different levels in height on a common side surface, i.e. in the first tier and in the second tier, respectively. For example, as in a storage battery module M7 of a fourth embodiment shown in FIG. 4B, connection is established such that an external terminal 11*fa* of a secondary battery RB3*a* in the second tier of a base module M1*a* is used as a positive electrode terminal, and an external terminal 11*fb* of a secondary battery RB2*b* in the first tier of a base module M1*b* is used as a negative electrode terminal.

Figure 4B:
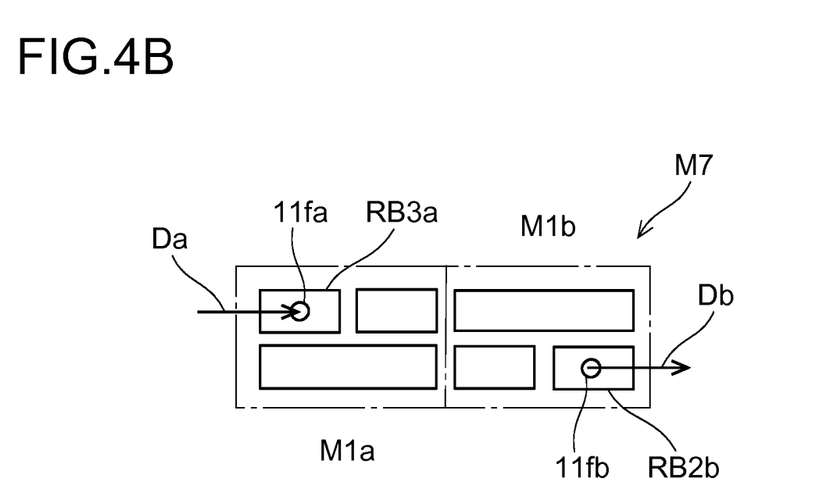
FIG. 4B is a schematic front view showing an example of a fourth embodiment of the storage battery module.

The storage battery module M7 having this configuration has the positive electrode terminal and the negative electrode terminal that are used to provide wiring of a positive electrode line Da and wiring of a negative electrode line Db, respectively, at different levels in height in a direction of a common side surface of this integrally formed module and thus can easily establish electrical connection to an external device whose wiring portions are provided at positions vertically shifted from each other.

Figure 5:
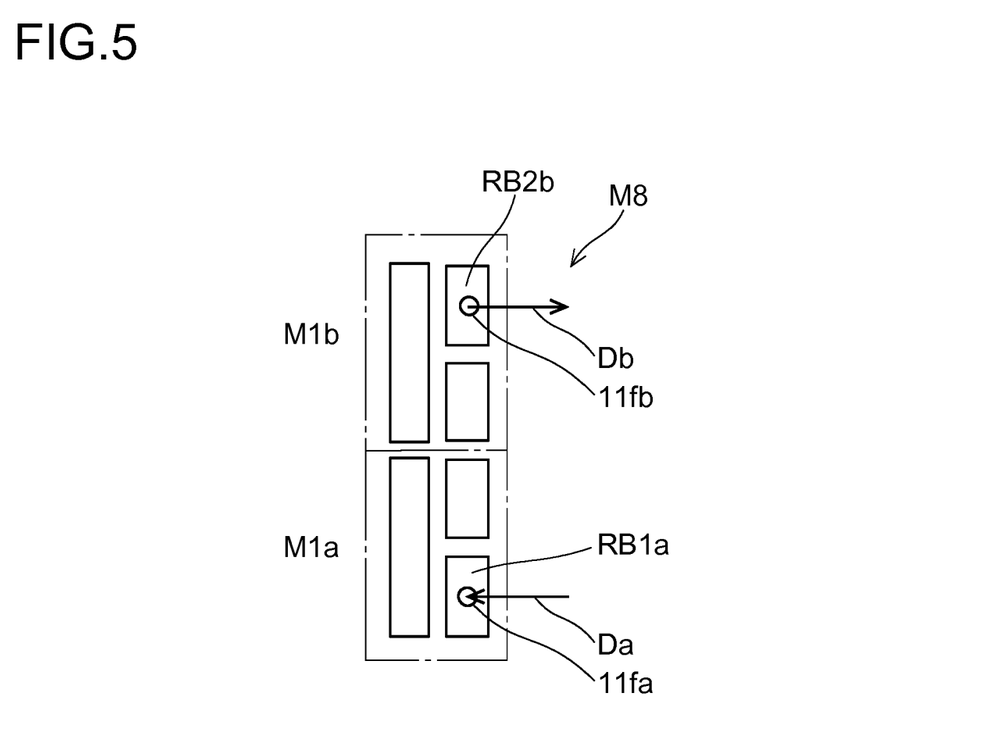
FIG. 5 is a schematic front view showing an example of a fifth embodiment of the storage battery module.

A storage battery module M8 of a fifth embodiment shown in FIG. 5 is a modified example of the third embodiment obtained by modifying the storage battery module M6 shown in FIG. 4A into an upright type, in which a base module M1*a* formed by integrally assembling four secondary batteries is disposed in an upright manner, and on the base module M1*a*, a second base module M1*b* is disposed in an upright manner and incorporated therewith so that thickness reduction can be achieved.

The storage battery module M8 is reduced in thickness and thus has a size that allows it to be installed in a narrow space. Furthermore, a positive electrode line Da is connected to an external terminal 11*fa* of a secondary battery RB1*a* of the base module M1*a*, and a negative electrode line Db is connected to an external terminal 11*fb* of a secondary battery RB2*b* of the base module M1*b*, whereby electrical connection to an external device can be easily established.

Each of the above-described storage battery modules M1 to M8 has a configuration in which a pair of secondary batteries are juxtaposed side by side such that they are spaced by a predetermined distance from each other to form a tier unit, and the tier units are stacked in parallel crosses, so that the secondary batteries are prevented from overlapping each other at their center portions where heat is likely to be generated and from being hermetically sealed, thus being free from the occurrence of heat accumulation. Thus, even in a configuration in which a plurality of secondary batteries are integrally assembled, the secondary batteries can be compactly assembled while non-uniformity in battery temperature distribution is prevented. Furthermore, the gap portion E between the juxtaposed secondary batteries being spaced from each other can be used as a wiring portion, and thus wiring is prevented from being exposed to the exterior, so that the need to provide an extra wiring route is eliminated. That is, a storage battery module can be obtained in which a plurality of secondary batteries can be compactly connected together while non-uniformity in battery temperature distribution is prevented, and wiring connection work is facilitated.

Figure 6:
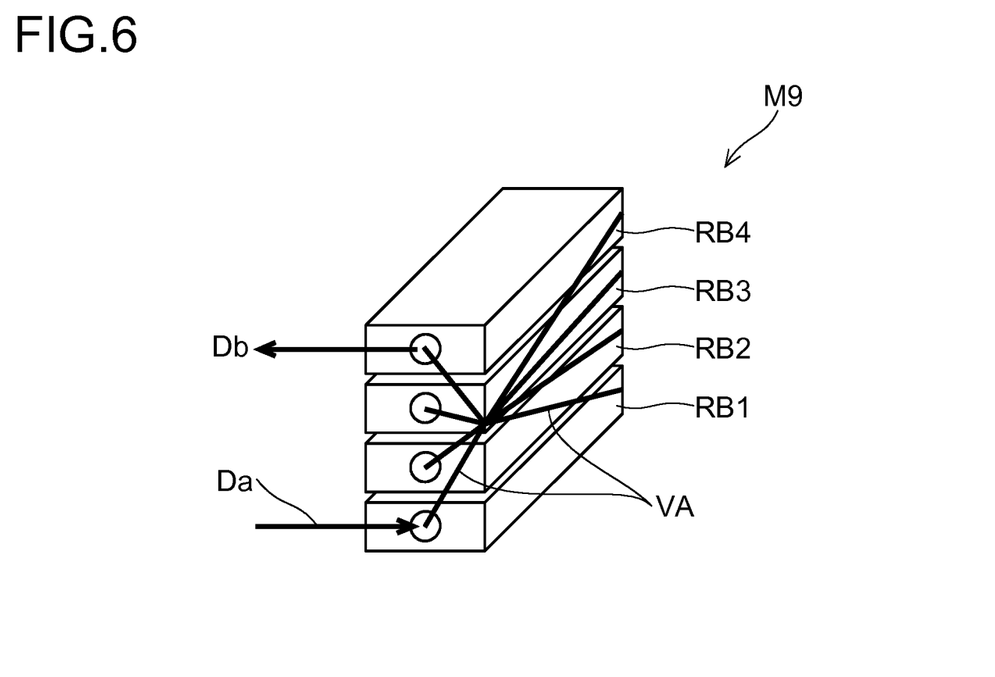
FIG. 6 is a schematic perspective view showing an example of wiring in a case of a conventional storage battery module.

Referring to FIG. 6, a description is given of, as a comparative example, a storage battery module having a configuration in which a plurality of secondary batteries are simply stacked without the gap portion E being provided. A storage battery module M9 as the comparative example shown in FIG. 6 has a configuration in which secondary batteries RB1 to RB4 are stacked one on top of each other and integrally assembled. In this configuration, the secondary batteries overlap each other at their center portions and are therefore not opened to the air, so that there occurs heat accumulation. Furthermore, wiring for connection of a positive electrode line Da and of a negative electrode line Db and for connection between external terminals can be provided in series in a vertical direction in which the secondary batteries are stacked, whereas a voltage detection line VA, which is connected to each of the external terminals so as to detect an operation status of each of the secondary batteries and perform control based on a result of the detection, needs to be routed externally around the secondary batteries.

For this reason, in the storage battery module M9 as the comparative example in which the plurality of secondary batteries are simply stacked, there is a risk that there occurs non-uniformity in battery temperature distribution, and wiring of the voltage detection line VA is exposed to the exterior to deteriorate the appearance of the storage battery module M9, so that it becomes difficult to achieve neat and compact wiring.

In each of the storage battery modules M1 to M8 according to the present invention, a plurality of secondary batteries are assembled in parallel crosses, and thus the secondary batteries are prevented from overlapping each other at their center portions that are likely to become heated and are opened to the air, so that a substantially uniform temperature distribution is obtained. Furthermore, each module is provided with one set of positive and negative electrode external terminals, and such modules can be integrated into one body, and thus wiring connection work is facilitated. Furthermore, as for wiring of a voltage detection line, a center gap portion formed in the center of the secondary batteries assembled in parallel crosses can be used as a wiring portion, and thus neat and compact wiring of the voltage detection line can be achieved.

Next, a lithium secondary battery and a storage battery module that were actually prepared are described.

EXAMPLES

Manufacturing of Positive Electrode Plate $LiFePO_4$ (88 wt %) as a positive electrode active material, carbon black (5 wt %) as an electrically conductive material, styrene-butadiene rubber (6 wt %) as a binder (binding agent), and carboxymethyl cellulose (1 wt %) as a thickening agent were mixed, and N-methyl-2-pyrrolidone as a solvent was appropriately added to prepare slurry. This slurry was uniformly applied onto both surfaces of aluminum foil (20 nm in thickness) as a positive electrode current collector and dried, after which the aluminum foil was compressed by roll pressing and cut into a predetermined size, and thus a plate-shaped positive electrode plate 2 was manufactured.

Furthermore, the positive electrode plate thus manufactured had a size of 150 mm×340 mm and a thickness of 400 nm, and 50 such positive electrode plates were used as the positive electrode plates 2.

Manufacturing of Negative Electrode Plate

Natural graphite (98 wt %) as a negative electrode active material, styrene-butadiene rubber (1 wt %) as a binder (binding agent), and carboxymethyl cellulose (1 wt %) as a thickening agent were mixed, and N-methyl-2-pyrrolidone as a solvent was appropriately added so that these materials were dispersed therein to prepare slurry. This slurry was uniformly applied onto both surfaces of copper foil (16 nm in thickness) as a negative electrode current collector and dried, after which the copper foil was compressed by roll pressing and cut into a predetermined size, and thus a negative electrode plate 3 was manufactured.

Furthermore, the negative electrode plate thus manufactured had a size of 154 mm×344 mm and a thickness of 350 nm, and 51 such negative electrode plates were used as the negative electrode plates 3.

Furthermore, as a separator, 102 polyethylene films having a size of 160 mm×350 mm and a thickness of 20 nm were manufactured.

Manufacturing of Non-Aqueous Electrolyte

Ethylene carbonate (EC) and diethyl carbonate (DEC) were mixed at a volume ratio of 30:70 to form a mixed solution (solvent), into which 1.2 mol/L of $LiPF_6$ was dissolved to prepare a non-aqueous electrolyte.

Manufacturing of Battery Can

A nickel-plated iron plate having a thickness of 0.8 mm was used as materials of an outer case and a lid member that constitute a battery can. Furthermore, the outer case was designed to have inside dimensions of 380 mm×170 mm×40 mm in its long-side direction (long side), short-side direction (short side), and depth to define a battery can size. Furthermore, as long as the lid member is configured to come into tight contact with an upper surface of an electrode group, the lid member may have a flat plate shape or such a dish shape as to be fitted into the inside of the can. In the embodiments of the present invention, in view of the fact that the positive electrode plates used had a total thickness of 20 mm (50 sheets×400 μm), the negative electrode plates used had a total thickness of 17.85 mm (51 sheets×350 μm), and the separators used had a total thickness of 2.04 mm (102 sheets×20 μm), totaling to a combined total thickness of about 40 mm, a lid member having a flat plate shape was used.

Assembling of Secondary Battery

The positive electrode plates and the negative electrode plates are alternately stacked via the separators. In doing this, the 50 positive electrode plates, the 51 negative electrode plates, and the 102 separators were stacked to construct an electrode group (stack) such that the negative electrode plate was positioned outward with respect to the positive electrode plate and such that, as a result of the alternate stacking, the separator constituted an outermost layer of the stack.

As described above, the separator that is interposed between the positive and negative electrode plates has a size of 160 mm×350 mm, which is somewhat larger than the respective sizes of the positive electrode plate (150 mm×340 mm) and the negative electrode plate (154 mm×344 mm). This allows the separator to reliably cover each of active material layers formed on the positive electrode plate and the negative electrode plate, respectively. Furthermore, a connection piece of a current collector member (current collector terminal) was connected to each of an exposed portion of a positive electrode current collector and an exposed portion of a negative electrode current collector.

Assembling of Storage Battery Module

A secondary battery used has, in a plan view, the shape of a rectangle with a long side and a short side, and as described above, the battery can housing the electrode group has a 380 mm long side and a 170 mm short side. Furthermore, a pair of the secondary batteries were provided side by side such that, with the respective long sides thereof aligned in parallel, they were spaced by a predetermined distance of 30 mm from each other, and such that respective positive and negative electrode external terminals thereof were alternate in orientation, and thus a tier unit was formed. A storage battery module (base module; corresponding to the storage battery module M1 shown in FIG. 1) was formed by stacking the tier units one on top of each other in two tiers in parallel crosses, installing a protection circuit, and electrically connecting together the four secondary batteries.

Furthermore, in a case where two secondary batteries in each tier are spaced by a distance of 30 mm from each other, in an assembly of four secondary batteries in total, a 30 mm square clearance portion is formed in a center portion thereof. Furthermore, a clearance portion having a width of 30 mm is formed in a center portion between ones in the upper tier among the secondary batteries assembled in two tiers, and in this clearance portion, an electrical component such as a protection circuit is mounted so that the clearance portion is used as a wiring route.

Example 1

As Example 1, a storage battery module (corresponding to the storage battery module M2 shown in FIG. 2) was formed in which the above-described base modules were stacked one on top of each other in two tiers such that they were shifted in orientation by 180° from each other, so that eight secondary batteries in total were connected together in series. Furthermore, by use of a fixing member that holds in a sandwiching manner the stacked base modules at predetermined areas on upper and lower sides thereof, the base modules were integrally fixed together so that respective cell temperatures could be easily measured.

With respect to this storage battery module, constant current and constant voltage charging was performed at 30 A for 5 hours up to 28 V, and after a 10-minute halt, constant current discharging was performed at 30 A down to 2.5 V, whereby initial setting of a module capacity was performed. Next, a cycle evaluation was performed in which a cycle of performing constant current and constant voltage charging at 100 A for 2 hours up to 28 V, followed by a 10-minute halt, and then performing constant current discharging at 150 A down to 20 V, followed by a 10-minute halt was repeated. At this time, concurrently therewith, a cell temperature was measured, and an evaluation was performed based on a result of subtracting a minimum value of the cell temperature from a maximum value thereof. In this measurement, a thermocouple was installed at a center portion on an upper surface of each of the batteries, and the measurement was constantly performed every 60 seconds. Furthermore, a retention capacity after 500 cycles was divided by an initial retention capacity to determine a cycle retention rate.

Example 2

A storage battery module of Example 2, which corresponds to the above-described storage battery module M6 shown in FIG. 4A, has a configuration in which base modules M1a and M1b are juxtaposed in a horizontal direction and represents a case where a positive electrode terminal and a negative electrode terminal are both provided in the first tier.

Example 3

A storage battery module of Example 3, which corresponds to the above-described storage battery module M7 shown in FIG. 4B, has a configuration in which base modules M1a and M1b are juxtaposed in a horizontal direction and represents a case where a positive electrode terminal and a negative electrode terminal are provided separately in the first tier and in the second tier, respectively.

Example 4

A storage battery module of Example 4 represents a thin storage battery module that is obtained by disposing the above-described storage battery module M6 in an upright manner and in which a positive electrode terminal and a negative electrode terminal are provided to be oriented upward.

Example 5

A storage battery module of Example 5 has the same configuration as that of the above-described storage battery module M2 and therefore is a storage battery module in which eight secondary batteries in total are connected together in series. In this storage battery module, however, each of the secondary batteries used has a configuration in which positive and negative electrode external terminals are provided at one side portion thereof. That is, this storage battery module represents an eight-series storage battery module formed by manufacturing a cell (secondary battery) in which a positive electrode terminal (external terminal for a positive electrode) and a negative electrode terminal (external terminal for a negative electrode) are provided on a common side of a battery can and by installing four-series modules each composed of four such cells in two tiers.

With respect also to each of the storage battery modules of Examples 2 to 5, by use of a fixing member that holds in a sandwiching manner the stacked base modules at predetermined areas on upper and lower sides thereof, the base modules were integrally fixed together, and the above-described operations, i.e. the initial setting of a module capacity and the cycle evaluation, the measurement of a cell temperature, and the calculation of a cycle retention rate, were performed.

Comparative Example 1

As comparative Example 1, using the storage battery module M9 shown in FIG. 6 in which the plurality of secondary batteries are simply stacked, an eight-series storage battery module was manufactured by juxtaposing the storage battery modules M9 in two rows and by connecting them together in series. With respect also to this storage battery module, the above-described operations, i.e. the initial setting of a module capacity and the cycle evaluation, the measurement of a cell temperature, and the calculation of a cycle retention rate, were performed.

With respect to each of the above-described storage battery modules of Examples 1 to 5 and Comparative Example 1, which are all eight-series storage battery modules, a difference between maximum and minimum values (hereinafter, referred to as a maximum-minimum difference) of a cell temperature and a cycle retention rate were determined, and a comparison thereof was made for evaluation. Table 1 shows results of the comparison.

TABLE 1

|  | Max. Temperature-Min. Temperature (° C.) | Cycle Retention Rate |
| --- | --- | --- |
| Example 1 | 5° C. | 97% |
| Example 2 | 4° C. | 99% |
| Example 3 | 4° C. | 99% |
| Example 4 | 4° C. | 99% |
| Example 5 | 7° C. | 96% |
| Com. Example 1 | 15° C. | 85% |

As shown in Table 1, Comparative Example 1 exhibits a large temperature difference, having a maximum-minimum difference of a cell temperature as large as 15° C. On the other hand, each of Examples 1 to 4 has a maximum-minimum difference of 4° C. to 5° C. and even Example 5 has a maximum-minimum difference of 7° C., which clearly shows that, in each of these examples, temperature unevenness is reduced compared with that in Comparative Example 1. That is, a plurality of secondary batteries can be compactly connected together while non-uniformity in battery temperature distribution is prevented.

Furthermore, as for a cycle retention rate, it can be seen that Comparative Example 1 exhibits a decrease to around 85%, whereas Examples 1 to 5 all exhibit a stable rate of not less than 96%. That is, in each of the storage battery modules according to the embodiments of the present invention, even when charging and discharging are performed repeatedly, there occurs no decrease in battery capacity, and thus quality can be maintained at a stable level.

As can be understood from this experiment, in a case where secondary batteries (battery cells) having a rectangular shape in a plan view are combined in parallel crosses and assembled such that they are prevented from overlapping each other at their center portions, non-uniformity in cell temperature becomes unlikely to occur, and thus stable battery performance is achieved. The battery can manufactured in each of Examples 1 to 5 has a size of 380 mm×170 mm. In order that the battery cans, when combined in parallel crosses, can be spaced by an appropriate distance from each other, it is preferable to use a battery can having a predetermined aspect ratio, and it can be said that a battery can having an elongated shape with an aspect ratio of, for example, 1:2 or more is used preferably.

As discussed in the foregoing, four secondary batteries in total are assembled in parallel crosses, with two of them in each tier are spaced by a predetermined distance from each other, to form a base module, and a large-scale storage battery module having a predetermined capacity can be formed by combining the base modules. This is based on the premise that one protection circuit is integrally provided per four secondary batteries. In a case, however, where one protection circuit can be integrally provided per eight secondary batteries, eight secondary batteries may be used as one unit forming a base module, and in a case where one protection circuit can be integrally provided per 12 secondary batteries, 12 secondary batteries may be used as one unit forming a base module. Furthermore, a fixing member that integrally fixes a plurality of base modules, a housing case that integrally houses a plurality of base modules, and so on are not particularly limited in configuration and can be of arbitrary shapes as required. Furthermore, a wiring portion is provided at the fixing member or the housing case and connected to each of the protection circuits of the base modules so that all the secondary batteries can be electrically connected together and integrally controlled.

Furthermore, in performing wiring work to electrically connect together a plurality of base modules, it is only required to sequentially connect an external terminal for a negative electrode (negative electrode terminal) of one of the plurality of base modules to an external terminal for a positive electrode (positive electrode terminal) of another of the plurality of base modules and then to establish connection to a power source terminal provided at the wiring portion, thereby allowing wiring connection work to be easily performed.

As discussed in the foregoing, according to the storage battery module of the present invention, a tier unit is formed by providing a pair of secondary batteries side by side such that they are spaced by a predetermined distance from each other, and a storage battery module is constructed by stacking the tier units in parallel crosses, so that the secondary batteries are prevented from overlapping each other at their center portions where heat is likely to be generated and from being hermetically sealed, thus being free from the occurrence of heat accumulation. Thus, even in a case of a storage battery module formed by integrally assembling a plurality of secondary batteries, the secondary batteries can be compactly assembled while non-uniformity in battery temperature distribution is prevented. Furthermore, a gap portion between juxtaposed secondary batteries being spaced from each other can be used as a protection circuit installation portion or a wiring portion for a voltage detection line or the like, and thus wiring is prevented from being exposed to the exterior, so that the need to provide an extra wiring route is eliminated to achieve facilitation in terms of workability of wiring connection work or the like.

That is, according to the present invention, a storage battery module can be obtained in which a plurality of secondary batteries can be compactly assembled while non-uniformity in battery temperature distribution is prevented, and wiring connection work is facilitated.

Moreover, the above-described tier units are stacked in two tiers in parallel crosses such that they are shifted in orientation by 90° from each other to form a base unit, and a large-scale storage battery module having a desired battery capacity can be formed by combining a plurality of the base units.

Furthermore, a plurality of secondary batteries are assembled in parallel crosses and a protection circuit is integrally provided therewith to form a base unit, and a storage battery module having a desired large capacity is constructed by combining a plurality of the base units. In this case, wiring connection work only requires to electrically connect together the base units and thus is facilitated to achieve improved workability.

INDUSTRIAL APPLICABILITY

Based on the above, the storage battery module according to the present invention is favorably applicable to a storage battery system that is desired to have a larger capacity and achieve facilitation in terms of assembling and wiring connection workability.

What is claimed is:

1. A storage battery module comprising a stacked type secondary battery including, inside a battery can, an electrode group in which positive electrode plates and negative electrode plates are stacked via separators to form a plurality of layers, the storage battery module being composed of a plurality of the secondary batteries connected together and integrated into one body,
    wherein battery cans of respective secondary batteries are insulated from each other,
    the secondary battery houses the electrode group and has, in a plan view, a shape of a rectangle with a long side and a short side,
    a plurality of the secondary batteries are arranged in a structure where they are stacked in parallel crosses such that in a direction in which the secondary batteries are juxtaposed, with the respective long sides thereof aligned in parallel, the secondary batteries are spaced by a predetermined distance from each other, and in a direction in which the secondary batteries are stacked, the secondary batteries are shifted in orientation by 90° from each other, with an open space portion formed in a center portion of the structure,
    positive and negative electrode external terminals are provided on both opposed side surfaces of the battery can along the short sides thereof,
    a pair of the secondary batteries are juxtaposed side by side such that the respective positive and negative electrode external terminals thereof are alternate in orientation to form a tier unit, and the tier units are stacked in parallel crosses, and
    a protection circuit installation portion or a wiring portion is arranged in the open space portion.

2. The storage battery module according to claim 1, wherein the tier units are stacked in two tiers, and the tier unit in a first tier and the tier unit in a second tier are shifted in orientation by 90° from each other so that four of the secondary batteries in total are assembled in parallel crosses.

3. The storage battery module according to claim 2, wherein the secondary batteries included in the tier unit in the first tier and the secondary batteries included in the tier unit in the second tier are assembled in parallel crosses to form a base module, and a plurality of the base modules are combined into a large capacity module.

4. The storage battery module according to claim 3, wherein the base modules are stacked one on top of each other and integrated into one body.

5. The storage battery module according to claim 4, wherein an upper one and a lower one of the stacked base modules are shifted in orientation by 180° from each other.

6. The storage battery module according to claim 3, wherein the base modules are juxtaposed horizontally and integrated into one body.

7. A storage battery module comprising a plurality of stacked type secondary batteries connected together and integrated into one body,
    each secondary battery including an electrode group in which positive electrode plates and negative electrode plates are stacked via separators to form a plurality of layers, and a battery can that houses the electrode group and has, in a plan view, a shape of a rectangle with a long side and a short side, a positive electrode external terminal on a first short side of the battery can, and a negative electrode external terminal on a second short side of the battery can that is opposite to the first short side, wherein the plurality of the secondary batteries are arranged in a plurality of tier units that are stacked in parallel crosses, each tier unit including a pair of secondary batteries that are juxtaposed side by side with the respective long sides thereof aligned in parallel and spaced by a predetermined distance from each other, the pair of secondary batteries in each tier unit being arranged such that the positive electrode external terminal of one secondary battery and the negative electrode external terminal of the other secondary battery are provided on a same side of the tier unit, and in a direction in which the tier units are stacked, adjacent tier units are shifted in orientation by 90° from each other, and an open space portion is formed in a center portion of the plurality of tier units that are stacked in parallel crosses, and a protection circuit configured to control charging and discharging of the secondary batteries is arranged in the open space portion.

8. The storage battery module according to claim 7, wherein the protection circuit controls charging and discharging of a total of four of the secondary batteries that are arranged in two stacked tier units.

\* \* \* \* \*